United States Patent [19]
Catros

[11] Patent Number: 4,558,361
[45] Date of Patent: Dec. 10, 1985

[54] PROCESS AND SYSTEM FOR THE COMPRESSION OF THE FLOW RATE OF DATA TRANSMITTED BETWEEN AT LEAST A TELEVISION TRANSMITTER AND A TELEVISION RECEIVER

[75] Inventor: Jean-Yves Catros, Paris, France
[73] Assignee: Thomson CSF, Paris, France
[21] Appl. No.: 504,828
[22] Filed: Jun. 16, 1983
[30] Foreign Application Priority Data Jun. 25, 1982 [FR] France ................................. 82 11213

[51] Int. Cl.$^4$ ............................................. H04N 7/12
[52] U.S. Cl. .................................. 358/136; 358/133; 358/135
[58] Field of Search ................. 358/133, 135, 136, 138

[56] References Cited
U.S. PATENT DOCUMENTS 4,268,861  5/1981  Schreiber et al. .................... 358/138

Primary Examiner—Howard W. Britton
Assistant Examiner—Victor R. Kostak
Attorney, Agent, or Firm—Cushman, Darby & Cushman

[57] ABSTRACT

Method and apparatus for compressing the flow rate of data transmitted between a television transmitter and a television receiver in which data to be transmitted is received at a differential coding device which includes a predictor, a quantizer, a transmitted data reconstruction device, and a code allocator. Pseudo-random data is added to the data to be transmitted in order to make the quantization levels of the quantizer fluctuate about a mean position. Upon reception, the received data is received at a differential decoding device which includes a code converter, a predictor, a transmitted data restoration device, and a digital filter. The received data is filtered to eliminate unwanted granular noise while retaining the image contours of the transmitted image.

10 Claims, 5 Drawing Figures

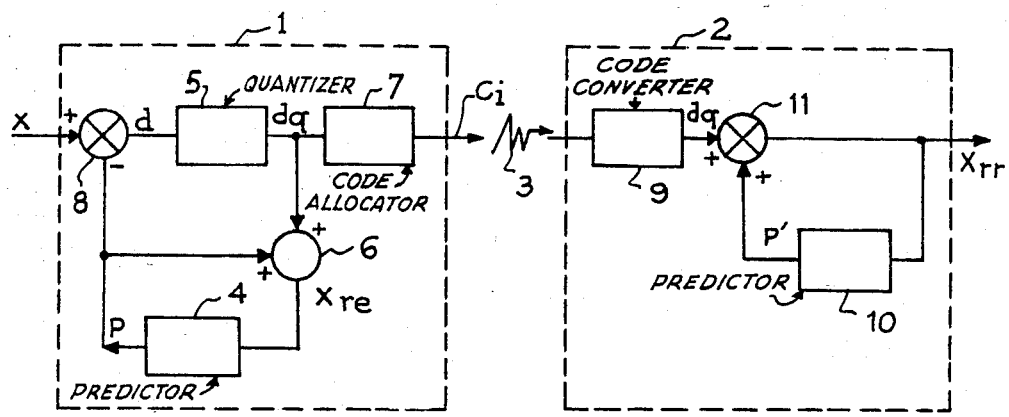
(PRIOR ART) Fig. 1
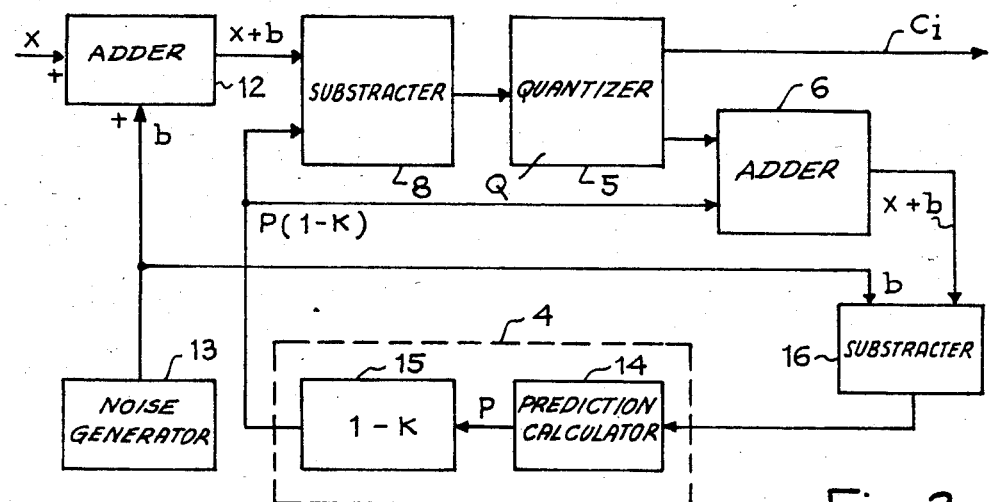
Fig. 3
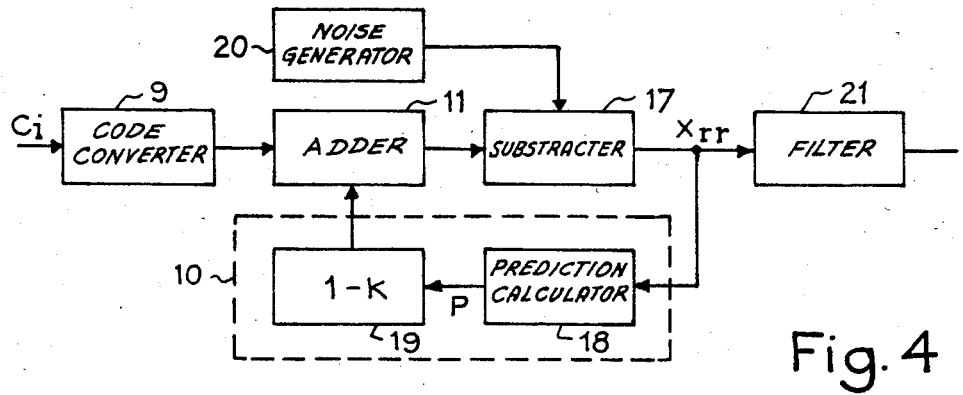
Fig. 4

PROCESS AND SYSTEM FOR THE COMPRESSION OF THE FLOW RATE OF DATA TRANSMITTED BETWEEN AT LEAST A TELEVISION TRANSMITTER AND A TELEVISION RECEIVER

BACKGROUND OF THE INVENTION

The invention relates to a process and to a system for the compression of the flow rate of data transmitted between at least a television transmitter and a television receiver In digital television, the luminance and color difference signals are digitized at 8 bits per spot, with a sampling frequency and structure dependent on the particular circumstances. This information is generally transmitted in real time and the rough flow rate is very high (specifically, higher than 140 megabits per second), which makes it necessary to reduce the flow rate so that existing transmission supports can be used.

Various processes and devices for reducing the flow rate are known. Of these, particular interest is attached to coding processes which use modulation of differential coded pulses of the television signals because of their constructional simplicity. This applies all the more in view of the fact that the transmitted data are constituted by fixed length binary code words, because of problems of managing buffer stores necessary for adapting the variable flow rate of the transmitter to the fixed flow rate of the channel connecting the transmitter to the receiver are eliminated. In addition, the use of intra-image coding makes it possible to obviate the systematic use of image stores. The known differential coding processes consist of coding the difference between the value of a sample of the signal and an estimate or prediction, calculated on the basis of the already coded preceding sample values, said difference being quantized by a quantizer with n quantization levels. With each level i is associated a code $C_1$, which is transmitted on the transmission channel or line. The code received is converted into its real value, which is then added to a prediction value calculated by the receiver in order to restore the signal. A feedback loop makes it possible to perform at the transmitter, a prediction identical to that carried out at the receiver. According to this principle, the prediction is produced at the transmitter on the basis of the restored value of the sampled value, and at the receiver, on the basis of the restored value of the received value, which may obviously be subject to error. If there is no transmission error, the restored values and those of the predictions at the transmitter and the receiver are identical. In the opposite case, the predictions at the transmitter and receiver differ and special precautions have to be taken to avoid the error being transferred to the following samples restored by the receiver. In order to reduce the transfer of transmission errors to following samples, one solution consists of also quantizing the prediction during coding and decoding, the code allocation to the quantized prediction error being carried out during coding and decoding, as a function of the quantized prediction. A transmission error which, during decoding, leads to an error on the corresponding quantized prediction for the following value is compensated by the calculation of the prediction error, which takes account of this quantized prediction.

Embodiments of digital data differential coding—decoding devices using the aforementioned error correction method and process are described in French Patent Application No. 8,120,167, filed in the name of the present Applicant.

However, a problem arises when it is wished to apply differential coding—decoding methods to the transmission of television pictures, particularly when it is wished to obtain a significant compression of the flow rate of transmitted data, because said differential coding—decoding processes do not make it possible to drop below a 4 bit coding per transmitted picture spot, with an intra-image coding and a fixed length code for the luminance component even though the lock in definition of the image obtained at the receiver which is caused by the reduction of the quantization levels, is compensated by adding pseudo random data to the transmitted data. Below a 4 bits coding value, the restored image quality is no longer acceptable.

Thus, a high flow rate compression leads to spaced quantization levels, which causes problems of restoring the image or picture, both for the uniform image zones and for the contours of the image. In the uniform image zones, slight luminance variations are directly perceived by the eye and it would consequently by preferable to quantize the luminance signal of the uniform zones with the aid of quantizers having close levels, so as to not unduly exaggerate the limited luminance variations, which could give rise to the appearance of false contours in the vicinity of the zero prediction error. However, on the contours of the image marking the transition between two uniform zones, a quantization with the aid of spaced reconstruction levels would be preferable for better restoring the contours. However, in this second case, the spacing between two levels cannot exceed a certain limit, beyond which the contours appear restored in the form of stairs or platforms.

SUMMARY OF THE INVENTION

Thus, the object of the invention is to improve the processes and devices for the compression of the flow rate when transmitting existing television pictures, so as to permit transmissions of coded image points with a very reduced number of bits, namely approximately 3, whilst ensuring an acceptable picture reconstruction quality.

To this end, the present invention relates to a process for the compression of the flow rate of data transmitted between at least a television transmitter and a television receiver, the data being coded at the transmitter by a differential coding device of the type incorporating a predictor, a quantizer, a transmitted data restoration device and a code allocator, and decoded at the receiver by a differential decoder incorporating a code converter, a predictor, and a transmitted data restoration device, said process consisting of adding to each data to be transmitted at the transmitter, pseudo-random data in order to make the quantization levels of the quantizer fluctuate about a mean position and filtering in the receiver the data obtained at the output of the transmitted data restoration device of the receiver by a digital filter to eliminate the unwanted granular noise, whilst respecting the image contours.

According to another feature, the process according to the invention consist of using an adaptive quantization characteristic, which is a linear function of the prediction value for reconstructing each of the data respectively transmitted and received at the transmitter and at the receiver.

The invention also relates to a system for compressing the flow rate of data transmitted between at least a television transmitter and a television receiver comprising, on the transmitter side, a device for the differential coding of the data to be transmitted and incorporating a predictor, a quantizer, a transmitted data restoration device and a pseudo-random code generator connected to an adder for applying, to the input of the differential coding device of the transmitter, pseudo-random data representing the sum of the data to be transmitted with the pseudo-random code supplied by the pseudo-random code generator, and comprising on the receiver side a device for the differential decoding of the data received incorporating a predictor and a device for the reconstruction of the transmitted data, as well as a digital filter connected to the output of the device for the reconstruction of the transmitted data in order to eliminate granular unwanted noise, whilst respecting the contours of the transmitted picture.

BRIEF DESCRIPTION OF THE DRAWINGS

The invention is described in greater detail hereinafter relative to non-limitative embodiments and with reference to the attached drawings, which show:

FIG. 1 is a system for compressing the flow rate of data transmitted between a transmitter and a receiver using a known differential coding—decoding device;

FIG. 3 shows an embodiment of a differential coding device according to the invention;

FIG. 4 shows an embodiment of a differential decoding device according to the invention;

DETAILED DESCRIPTION OF THE INVENTION

Figure 2:
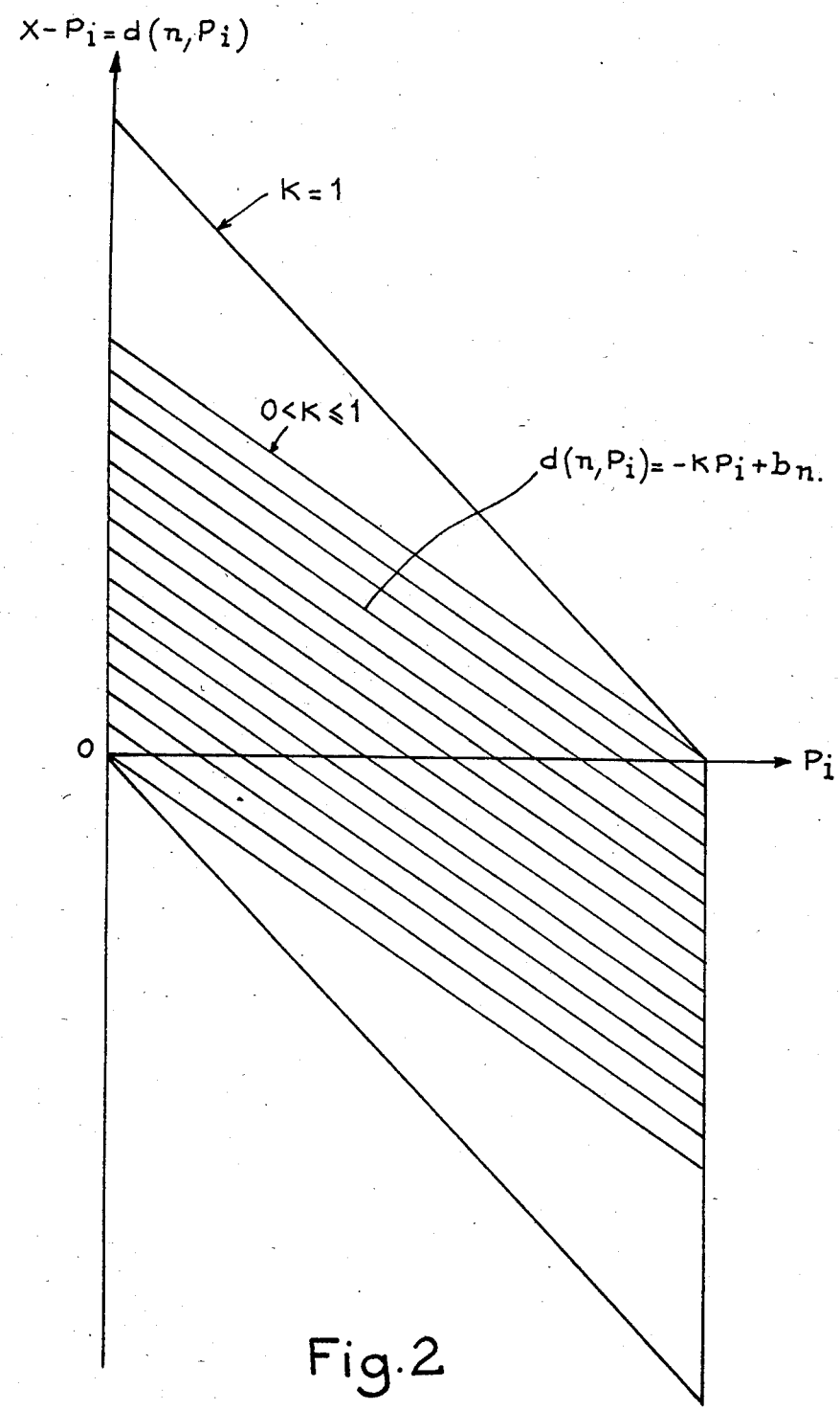
FIG. 2 shows graphs of adaptive prediction characteristics used for performing the invention.

The known differential coding—decoding system shown in FIG. 1 comprises, on the transmitter side, a differential coding device 1, shown inside a dotted line rectangle, and on the receiver side, by a differential decoding device 2, also shown in a dotted line rectangle. The output of the coding device 1 is connected to the input of the decoding device 2 by means of a transmission channel 3. The differential coding device 1 comprises a predictor 4, a quantizer 5, a transmitted data reconstruction device 6 and a code allocator 7. The digital or analog data X to be transmitted are applied to the input of a subtracter 8, whose other input is connected to the output of predictor 4. Predictor 4 supplies a prediction value P. The data X to be coded, reduced by the prediction value p, is applied to the input of the quantizer 5 by the output of subtracter 8 in order to be quantized according to n levels. With each quantization level i, a code allocator 7 associates a code $C_i$, which is transmitted on line or channel 3. The quantization level dq supplied by quantizer 5 and which corresponds to the difference X-p, is applied to the input of the transmitted data reconstruction device 6, generally constituted by an adder, whose other input is connected to the output of predictor 4. The reconstructed data $X_{re}$ transmitted to the output of the transmitted data reconstruction device 6, is applied to the input of predictor 4. Code $C_i$ is received by the decoding device 2, which is constituted by a code transformer 9, a predictor 10 and a received data reconstruction device 11. The code transformer 9 restores the quantization levels dq, in order to apply them to a first input of the received data reconstruction device 11. The latter, which is generally formed by an adder, receives at its first input the prediction value p' calculated by predictor 10 and supplies at its output, the value $X_{rr}$ of the received reconstructed data.

The quantization operation performed by quantizer 5 makes it possible to associate a single code value $C_i$ with each of the difference values X-p between two thresholds $S_i$ and $S_{i+1}$. This operation performed with the aid of code allocator 7 makes it possible to reduce the flow rate in differential coding. In the case when there is no transmission error, and as it is ensured in both the transmission device and in the reception device that the same prediction functions exist for predictors 4 and 10, the reconstructed values respectively $X_{re}$ and $X_{rr}$ at the transmitter and receiver are identical. Obviously, in the opposite case, these values differ and as the calculated prediction value is dependent on the reconstructed value at the predictor input, in the case of an error, the predictions at the transmitter and receiver diverge. Consequently, if no precautions are taken to minimize the transmission errors at the transmission times of the following data, the following data received will suffer from errors.

Embodiments of the devices making it possible to solve this problem are described in French Patent Application No. 8,120,167 of the present Applicant. The system according to the invention is drawn back from the general system shown in FIG. 1. However, according to a special variant of the present invention, for allocating the codes $C_i$ as a function of the prediction levels, it is possible to use a special adaptive quantization characteristic, which would appear simple to realize, whilst also ensuring good protection against transmission errors. It consists of determining the reconstructed data value, by using an adaptive characteristic, which is a linear function of the prediction. The adaptive characteristic is defined on the basis of the equation:

$$d(n,p_i) = -kp_i + b(n)$$

k being equal to or less than 1, n being the allocated code corresponding to a prediction level $p_i$ and b(n) is the prediction error for the zero prediction level.

FIG. 2 shows a graph of these characteristics in the form of a system of straight lines. The prediction values $p_i$ are plotted on the abscissa and the prediction errors $x - p_i = d(n,p_i)$ plotted on the ordinate. The slope of these lines is defined by the coefficient k and their intersection with the ordinate axis is dependent on b(n). On calculating the error between the reconstructed values at the receiver and the transmitter at the time following the transmission error, values $X_{re}$ and $X_{rr}$ are then defined by the formulas:

$$X_{re} = p_i + d(n,p_i) = p_i - kp_i + b(n)$$

$$X_{rr} = p_i + d(n,p_j) = p_j - kp_j + b(n)$$

and the error is equal to:

$$E = X_{rr} - X_{re} = (p_i - p_j)X(1-k)$$

In the special case where the prediction is defined on the basis of the restored value of the preceding point, the decrease in the error $E_{(rT)}$ is equal to:

$$E(rT) = E(r-1)TX(1-k)$$

in which $$E(rT) = E(0)X(1-k)^n$$

in which $rT$, $(r-1)T$ ... designate the successive transmission times following the first time.

As k belongs to the interval (0,1) the error decreases exponentially with a speed dependent on the values of $1-k$. In practice, the value of the coefficient k is chosen so as to obtain the image contours subjectively considered best by an observer. On taking $k-1$, a transmission error will have no effect at the following transmission time. This result can be obtained by the system shown in FIGS. 3 and 4.

The differential coding device according to the invention is shown in FIG. 3. As in FIG. 1, it comprises a predictor 4, a quantizer 5, a reconstruction device 6 and a subtracter 8 for carrying out the subtraction between the data to be transmitted and the prediction value calculated by predictor 4. Subtracter 8 is connected via an adder 12 to the output of a noise or pseudo-random code generator 13, both located in the not shown transmitter. The data X to be transmitted are transmitted by the transmitter to the input of adder 12, whose other input is connected to the output of generator 13, which supplies pseudo-random data representative of a noise sample b. The data representing the noise sample b are added to the data X to be transmitted by adder 12 and the addition result is random data, which is transmitted by the output of adder 12 to the input of subtracter 8. At its other input, subtracter 8 receives the prediction value supplied by predictor 4. Predictor 4 comprises a prediction calculation device 14, whose output is connected to the input of a multiplier 15 by a factor $1-k$, of the prediction value calculated by the calculating device 14, in which k represents the value $\leq 1$ of the coefficient of the previously described adaptive characteristic. The output of multiplier 15 is connected to the second input of subtracter 8, in order to apply to said input, the prediction value calculated by device 14, multiplied by the coefficient $1-k$. The output of multiplier 15 is also connected to a first input of the reconstruction device 6, constituted by an adder, whose second input is connected to a first output of quantizer 5. For example, quantizer 5 supplies a value coded on 8 bits corresponding to the quantized value of the prediction error. The output of adder 6 supplies a binary value $X+b$ on 8 bits, corresponding to the binary data value X to be transmitted and to which is added a pseudo-random value supplied by noise generator 13. Value $X+b$ is applied to a first input of a subtracter 16, whose second input is connected to the output of the noise generator 13. Thus, the output of subtracter 16 supplies a reconstructed data value $X_{re}$, free from its noise component at the input of predictor 4. The prediction error supplied by subtracter 8 at the input of quantizer 5 is coded by the latter in accordance with 8 quantization levels $S_0$ to $S_7$ and an internal coder supplies, for each prediction error between the two thresholds, a binary value $C_i$ coded in the present embodiment on 3 bits. This code is transmitted on the transmission channel 3 to the input of the differential decoder shown in FIG. 4. Apart from the elements 9, 10 and 11 shown in FIG. 1 and constituted by code converter 9, predictor 10 and adder 11, the device shown in FIG. 4 also comprises the following supplementary elements.

A subtracter 17 is placed between the outputs of adder 11 and of predictor 10. As in the case of predictor 4, predictor 10 comprises a prediction calculating device for prediction calculator 18, connected by its input to the output of subtracter 17 and by its output to the input of a multiplier 19 by a multiplication factor $(1-k)$ and the output is connected to a first input of adder 11, the second input of adder 11 being connected to the output of code converter 9. A noise generator 20 is positioned in the receiver and is connected by its output to a second input of subtracter 17. The noise generator 20, synchronized with that of the transmitter, supplies random codes on 8 bits to the second input of subtracter 17. The output of subtracter 17 is also connected to the input of a digital filter 21, which supplies the value of the spot to be visualized on its output. At its input, code converter 9 receives the value of code $C_i$ transmitted by the coding device of the transmitter and converts the corresponding value coded on 3 bits into a coded value on 8 bits corresponding to the modified prediction error $X+b-(1-k)p$, previously processed in the transmitter. The prediction value p, processed by the prediction calculator 18 and multiplied by factor $1-k$ is added to the value coded on 8 bits transmitted by code converter 9, by means of adder 11, which restores the random data $X+b$ at its output. The noise level b coded on 8 corresponding bits, supplied by the noise generator 20 is subtracted by subtracter 17 from the value $X+b$ and the result of this subtraction, which corresponds to the received data value coded on 8 bits, is transmitted by the output of subtracter 17 to the input of predictor 10, as well as to the input of digital filter 21.

The system shown in FIGS. 3 and 4 without filter 21 makes it possible to obtain clearly defined image contours, whilst using a quantizer having a very reduced number of levels (8 levels). However, the filter-free system does not eliminate the granular unwanted noise appearing on the image and which is mainly visible in the uniform zones thereof.

The function of filter 21 is to filter this granular noise, whilst preserving the image contours. This operation takes place by a detection of the luminance gradients or the interpoint luminance or chrominance differences exceeding a predetermined threshold for revealing the passage points of the contours of the image separating adjacent uniform zones, followed by performing a spatial mean for each point of the luminance or chrominance sample values giving the state of adjacent points in the same uniform zone. This filtering can firstly take place in horizontal directions of the image with the aid e.g. of a window surrounding the point to be filtered and of length L countered at the number of points in the horizontal directions of the image. Each point to be filtered is then replaced by the mean value of the state of the actual point and the state of the adjacent points located within the window in the same uniform zone of the image to which belongs the filtered point.

Thus, for example, for a configuration of points $p_1$ to $p_n$ respectively having the luminance values $X_1$ to $X_n$, distributed over a same line of the image, in the uniform zones $Z_1$ to $Z_4$ separated by the contours, where point $p_1$ belongs to uniform zone $Z_1$, points $p_2$ and $p_3$ belong to uniform zone $Z_2$, points $p_4$, $p_5$ and $p_6$ belong to a uniform zone $Z_3$ and points $p_7 \ldots p_n$ belong to a uniform zone $Z_4$, the filtering operation performed on the luminance or chrominance values $X_1, X_2 \ldots X_n$ of each point of the image consists of performing the following sequence of operations:

$$X_{1f} = X_1 \quad \text{in zone } Z_1$$

$$\left.\begin{array}{l} X_{2f} = \dfrac{X_1 + X_2}{2} \\ X_{3f} = \dfrac{X_3 + X_4}{2} \end{array}\right\} \text{in zone } Z_2$$

$$\left.\begin{array}{l} X_{4f} = \dfrac{X_4 + X_5}{2} \\ X_{5f} = \dfrac{X_4 + X_5 + X_6}{2} \\ X_{6f} = \dfrac{X_7 + X_8}{2} \end{array}\right\} \text{in zone } Z_3$$

$$\text{etc} \ldots \left.\begin{array}{l} X_{7f} = \dfrac{X_7 + X_8}{2} \\ X_{nf} = \dfrac{X^{n-1} + X^n}{2} \end{array}\right\} \text{in zone } Z_4$$

Figure 5:
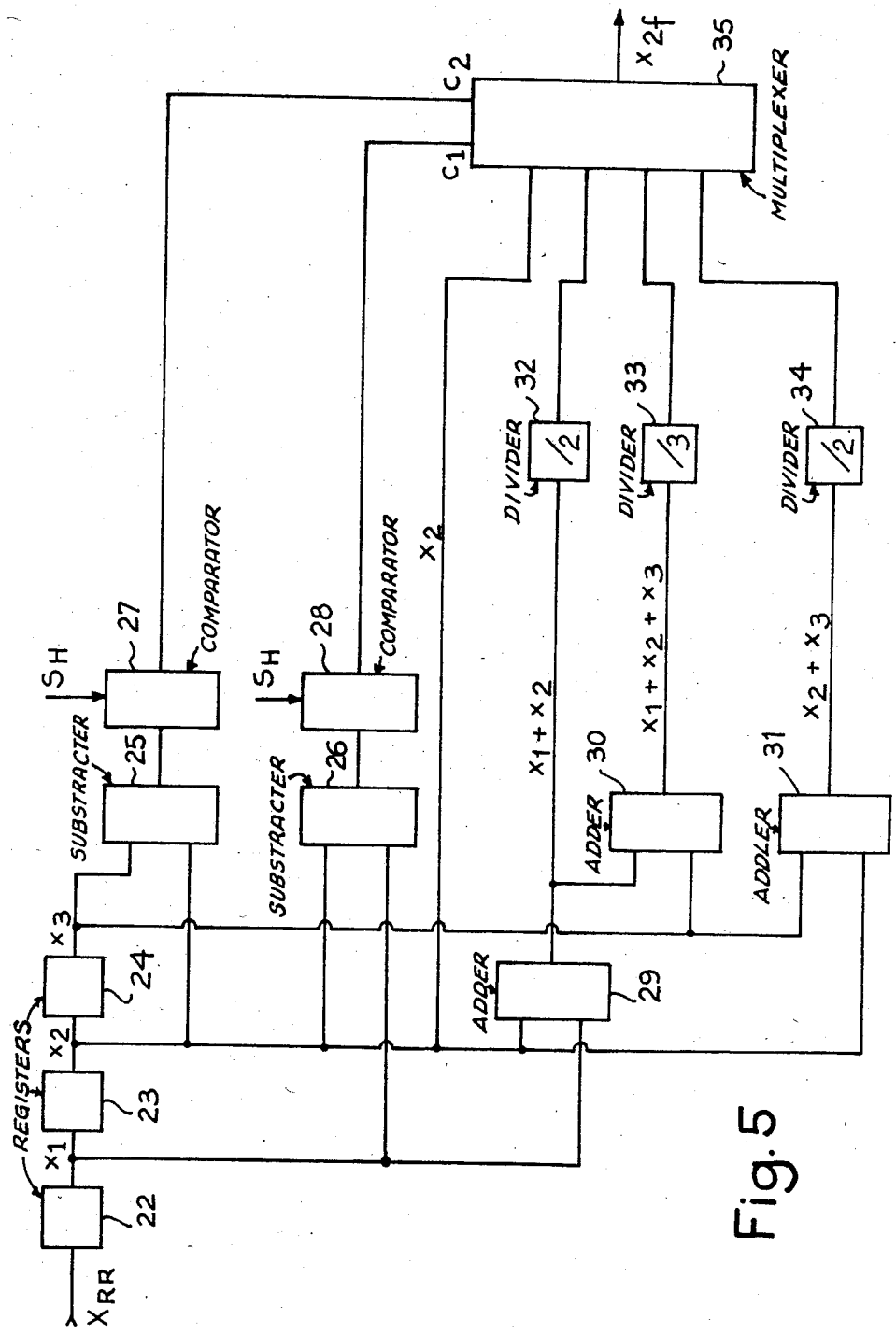
FIG. 5 shows an embodiment of a digital filter used at the transmitter or receiver for permitting the display of the data received.

The embodiment of the filter of FIG. 5 makes it possible to carry out the filtering operations described hereinbefore. The filter of FIG. 5 comprises three registers 22, 23 and 24, each having a length of 8 bits and which are connected in series. It comprises a device for detecting the different interpoints above a fixed predetermined threshold SH, which is formed by subtracters 25, 26, comparators 27, 28, as well as devices for calculating the mean values of the points located in the uniform zones and formed by adders 29, 30, 31 and dividers 32, 33, 34. A multiplexer 35, controlled by the output of comparators 27, 28, branches the outputs of the results of the calculation of the mean values of calculation devices 32, 33, 34 to the output of filter 21, as a function of the state of comparators 27 and 28. Data $X_{rr}$ on 8 bits received and reconstructed by the decoder of FIG. 4, are applied to the input of register 22 and are then successively transmitted into registers 23, 24 at the transmission rate of the data on the transmission channel. The two inputs of subtracter 25 are respectively connected to the outputs of registers 23, 24. Subtracter 25 calculates the difference between the contents of registers 23, 24 and the result of this difference is applied to the input of comparator 27 to be compared with the predetermined threshold SH. The output of comparator 27 assumes logic state 0 when the result of the difference of the contents of registers 23, 24 is below the predetermined threshold SH. The output of comparator 27 assumes logic state 1 when the variation between the contents of registers 23 and 24 exceeds the predetermined threshold SH. The inputs of subtracter 26 are respectively connected to the outputs of registers 22, 23. Subtracter 26 calculates the difference of the contents of registers 22, 23 and applies the result of this difference to one input of comparator 28, which compares the result obtained with the predetermined threshold SH. Comparator 28 supplies a signal of logic level 1 when the difference in the contents of registers 22, 23 exceeds the predetermined threshold SH and supplies a signal of logic level 0 when the difference of the contents of registers 22,23 is below the predetermined threshold SH. The inputs of adder 29 are respectively connected to the outputs of register 22, 23, for adding the content of each of these two registers and to apply the result of the addition obtained, to the input of a divide by two divider 32 constructed e.g. with the aid of a shift register. The inputs of adder 30 are respectively connected to the output of adder 29 and to the output of register 24 for calculating the sum of the contents of registers 22, 23, 24 and for applying the result obtained to the input of a divide by three divider 33, which can e.g. comprise a 1 kilo octet programmable with read-only memory containing a division by three table. The two inputs of adder 31 are respectively connected to the output of register 24 and to the output of register 23. Adder 31 calculates the sum of the contents of registers 23, 24 and applies the result obtained to the input of a divide by two divider 34, which can also be in the form of a single shift register. Multiplexer 35 has four inputs respectively connected to the output of register 23, to the output of the divide by two divider 32, to the output of the divide by three divider 33 and to the output of the divide by two divider 34. The control inputs $C_1$, $C_2$ of the multiplexer 35 are connected to the respective outputs of comparators 28, 27. The content of register 23 is only selected by multiplexer 35, when the outputs of comparators 27, 28 both have the logic value 1, i.e. when the two points of the filtering window are on either side of the point to be filtered on two uniform zones differing from that of the point to be filtered. The output of divider 32 is selected when the point corresponding to the content of register 24 is in a uniform zone adjacent to that of the point to be filtered. The output of divider 33 is selected when all the points of the window are in the same zone. Finally, the output of divider 34 is selected when the point corresponding to the content of register 22 is located in the zone adjacent to that of the point to be filtered. The filter shown in FIG. 5 consequently makes it possible to eliminate the granular noise close to each point of a horizontal line located on an image contour. As the same granular noise also exists in the vertical direction of the image, an equivalent filtering is carried out with the aid of a circuit identical to that of FIG. 5 for eliminating the granular noise in this direction by using the already filtered values for the horizontal direction.

In a filtering variant, the two successive filtering operations can be reduced to a single operation, by using a bidimensional averaging filter respecting the image contours.

According to another embodiment, instead of being placed in the receiver at the output of the decoding device, filter 21 could also be placed in the decoding loop between the output of subtracter 17 and the input of predictor 18. This makes it necessary to provide the same filter in the coding loop of the transmitter between the output of subtracter 16 and the input of predictor 4. In this case, the value of the coded data on three bits transmitted on the connecting channel will correspond to a coded value of an image sample free from its granular noise.

It should also be noted that according to another embodiment of the invention, particularly in the case of the transmission of television pictures, the presence of a noise generator at the receiver is not absolutely necessary and when it is absent, the quality of the reconstructed images at the receiver is still acceptable. Naturally, in this case, the construction diagram of the transmission system is simplified, because it is no longer necessary to use noise sample subtracters 16, 17 at both the transmitter and the receiver.

Although the invention has been described hereinbefore relative to the specific embodiments, its scope is in no way limited thereto and in fact covers random variants thereof.

What is claimed is:

1. A process for compressing the flow rate of data transmitted between at least one television transmitter and at least one television receiver, said data being coded at said transmitter by a differential coding device including a first predictor, a quantizer, a first transmitted data restoration device, and a code allocator, said data being decoded at said receiver by a differential decoder including a code converter, a second predictor, and a second transmitted data restoration device, comprising the steps of:

adding pseudo-random data to each data which is transmitted to cause quantization levels of said quantizer to fluctuate about a mean position; and filtering data received from said second transmitted data restoration device to eliminate unwanted granular noise while retaining image contours, said filtering being accomplished by detecting luminance gradients or chrominance differences exceeding a predetermined threshold for revealing passage points of the image contours separating adjacent uniform zones, and by calculating a spatial mean for each point of luminance or chrominance sample values giving the state of adjacent points in the same uniform zone.

2. A process according to claim 1, wherein an adaptive quantization characteristic, which is a linear function of the prediction values, is used for reconstructing each of the data transmitted and received at said transmitter and at said receiver, respectively.

3. A process according to claim 2 including the further step of subtracting at said transmitter and said receiver, the same pseudorandom data from the transmitted data reconstructed at both said transmitter and said receiver for applying to each of said first and second predictors, reconstructed data, free from the psuedorandom data introduced on transmission.

4. Apparatus for compressing the flow rate of data transmitted between at least one television transmitter and one television receiver interconnected by a transmission channel, comprising:

means for differential coding of data to be transmitted, said means including:
a pseudo-random code generator for providing pseudo-random code;
a first adder coupled to said code generator and receiving said data to be transmitted, for providing a sum signal;
a quantizer coupled to said adder;
a first transmitted data reconstruction device, coupled to said quantizer; and
a first predictor coupled to said first reconstruction device; and means for differential decoding of received data, said means including:
a second transmitted data reconstruction device receiving said received data;
a second predictor coupled to said second reconstruction device; and
filter means, coupled to said second reconstruction device, for eliminating unwanted granular noise from said received data while retaining image contours of a transmitted image, said filter means including a device for detecting interpoint luminance gradients of said image which exceed a predetermined threshold for selecting points located on said image contours, and (b) means for replacing each analyzed image point by a mean value obtained on luminance or chrominance values of the analyzed points with adjacent points located in a uniform zone of an initial image or a previously filtered image surrounding each analyzed point.

5. Apparatus according to claim 4, wherein said differential coding means futher includes a subtracter coupled between said first transmitted data reconstruction device and said first predictor, for applying to said first predictor a numerical quantity corresponding to a restored value of data applied to said differential coding means, free from the pseudo-random code supplied by said pseudo-random code generator.

6. Apparatus according to claim 5, wherein said differential decoding means further includes a pseudo-random code generator coupled between said second data reconstructing device and said second predictor for restoring data provided to said predictor.

7. Apparatus according to claim 6, wherein said differential coding means further includes a subtracter having one input connected to said first adder and a second input connected to said first predictor.

8. Apparatus according to claim 7, wherein said first predictor includes a multiplier which multiplies a prediction value calculated by said first predictor by a coefficient $1-k$, in which k is equal to or less than 1.

9. Apparatus according to claim 8, wherein said second reconstruction device includes an adder having one input connected to said transmission channel via a code converter and a second input connected to said second predictor.

10. Apparatus according to claim 9, wherein said second predictor includes a multiplier which multiplies a prediction value calculated by said second predictor by a coefficient $1-k$, in which k is equal to or less than 1.

* * * * *